Figure 1:
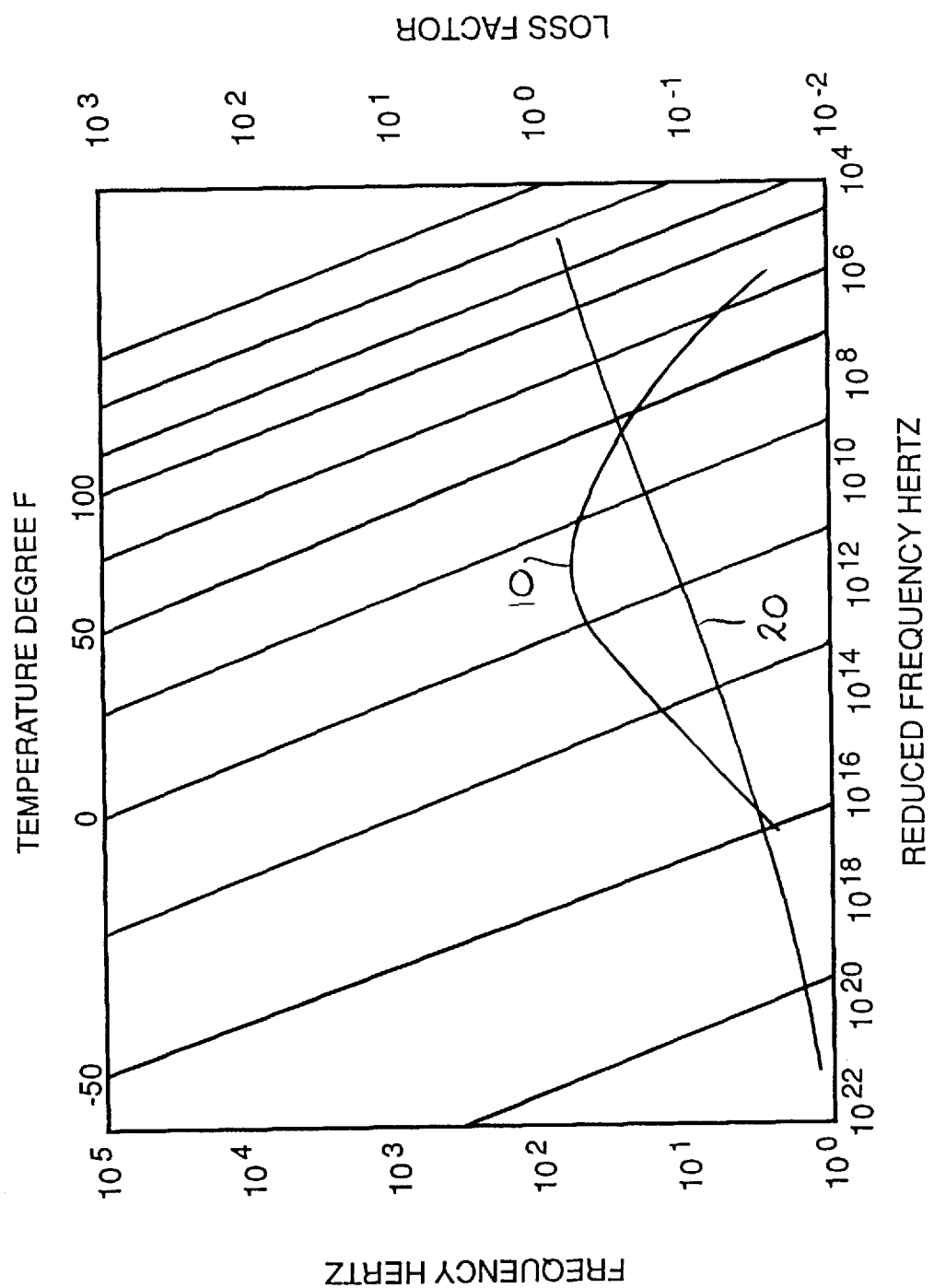

United States Patent

Philipps et al.

[11] Patent Number: 5,849,819
[45] Date of Patent: Dec. 15, 1998

[54] VIBRATION DAMPING MATERIAL

[75] Inventors: Thomas E. Philipps; Charles L. Meteer, both of Granville, Ohio

[73] Assignee: Isorca, Inc., Granville, Ohio

[21] Appl. No.: 785,617

[22] Filed: Jan. 17, 1997

Related U.S. Application Data

[63] Continuation-in-part of Ser. No. 472,340, Jun. 7, 1995, abandoned.

[51] Int. Cl.⁶ .................. C08J 9/32; C08K 3/34; C08L 95/00
[52] U.S. Cl. ................ 524/59; 523/218; 524/449; 524/451
[58] Field of Search ............... 523/218; 524/59, 524/425, 444, 449, 451, 492, 493, 495, 496

[56] References Cited

U.S. PATENT DOCUMENTS

| | | | |
|---|---|---|---|
| 3,544,576 | 12/1970 | Barnes et al. ............... | 524/59 |
| 3,753,938 | 8/1973 | Edwards et al. ............. | 428/291 |
| 4,013,603 | 3/1977 | Zavatti et al. .............. | 524/59 |
| 4,371,654 | 2/1983 | Spielau et al. .............. | 524/59 |
| 4,623,586 | 11/1986 | Umeya et al. ............... | 524/495 |
| 5,567,364 | 10/1996 | Philipps ..................... | 524/68 |

*Primary Examiner*—Peter A. Szekely
*Attorney, Agent, or Firm*—Charles F. Schroeder

[57] ABSTRACT

Vibration damping material in which polyvinyl chloride (PVC) and a particle filler such as fly ash or talc are amalgamated into a matrix by combination with a small percentage by weight of blown asphalt in a heat working process, such as extrusion, for forming a product such as a sheet of the material. By use of blown asphalt as a compatibilizer and amalgamator, waste or recycled PVC such as of electrical wire strippings combined with a filler has provided excellent damping characteristics.

20 Claims, 1 Drawing Sheet

VIBRATION DAMPING MATERIAL

This application is a continuation-in-part of application Ser. No. 08/472,340 filed Jun. 7, 1995, now abandoned.

FIELD OF THE INVENTION

The present invention is a low cost vibration damping material and method of its manufacture, the material having the capability of providing unusually high temperature damping performance properties. The damping material is made with a visco-elastic polymer material such as a vinyl material which can be provided by using various recycled polyvinyl chloride from waste bottles or scrap wire strippings combined with a filler of particulate material such as fly ash, talc, mica or graphite, and a compatibilizer which according to the invention has been found is admirably provided by asphalt, preferably blown asphalt added in granular form.

BACKGROUND

Polymer materials have been used for vibration damping and vibration isolation systems for many years in the aerospace, automotive, appliance, computer, naval, and many other industries. Almost all commercial vibration damping materials, such as acoustic and mechanical vibration damping material, are comprised of some form of polymer with a filler such as mica or graphite flake, talc or calcium carbonate particle fillers. In producing vibration damping materials a goal is to get millions of small particles in the matrix of the material for dissipation of vibration energy in frequency ranges for which the material can be customized by trial and error. One filler which has particular advantage for such use is fly ash in that it can be obtained as recycled waste material available at an economical price.

All visco-elastic damping materials heretofore have, in a sense, a Gaussian-like or bell-shaped characteristic in which as the temperature of the material increases, vibration damping performance builds up gradually to a peak, dependent upon the material being tested, from which it progressively diminishes from the characteristic peak temperature. By changing the blend of plasticizer and filler, the temperature for peak performance can be modified in that the bell-shaped curve having a central peak can be shifted to either a lower or higher point on the temperature scale.

The term "blown asphalt" as utilized herein is asphalt in a hard, friable solid condition obtained by blowing air at high temperature through mineral residual oils of a refinery. Such asphalts also are known as oxidized asphalts, condensed asphalts, and mineral rubber. As used in the present invention such blown asphalts are ground into particles such as granules or powder and used in combination with dissimilar polymers to effect an amalgamation of the combination. The blown asphalt utilized herein has a softening point in the order of 305–315 degrees F. and the flash point of the asphalt is in the order of 600 degrees F.

BRIEF DESCRIPTION OF THE INVENTION

Vibration damping material of the invention is produced by combining polyvinyl chloride (PVC) and a filler and adding blown asphalt in a heat working process such as extrusion. The resultant damping material is in a sense an amalgamation of the constituents in which an adhesive enhancement between the PVC and filler occurs. Then as the temperature of the material increases, the PVC maintains a strong bond with the filler. With Such a bond the vibration energy transfer from the filler to the visco elastic material is facilitated at high temperatures. The resulting damping material has been found to provide damping performance characteristics heretofore not known to have been attained.

The amalgamating ability or characteristic of the blown asphalt lends itself to combination of fillers with waste PVC regardless of the presence of contaminants. Waste or recycled PVC is obtained commercially, for example, in the form of electrical wire strippings. By the use of asphalt as an amalgamating material, waste PVC, such as from wire strippings, which may contain a number of contaminants such as particles of copper, aluminum, jute or cross linked polyethylene, are all combined into the amalgamated matrix having excellent vibration damping characteristics particularly at higher than usual temperatures for damping materials.

An object of the invention is to provide a vibration damping material having a high efficiency such that much less material is required for a given damping result.

Another object of the invention is to provide a vibration damping material which functions as a low loss material having a higher than usual degree of stiffness for integrity.

A feature of the invention is that the higher temperature damping properties of the material of the invention allow higher temperature uses of the damping material such as for heated clothes drier tubs and dishwashers which require a damping property preferably having a peak response in the range of 140 to 160 degrees F. and above. Other uses for such material are for computers, appliances generally, and automotive and aircraft uses.

Another feature of the invention is that the optimum performance can be provided with damping material at least 33 percent less in weight than known asphaltic based materials generally available commercially.

DRAWING

FIG. 1 is a nomographic type chart showing how damping material of the present invention compares in vibration energy dissipation at high temperatures compared to more conventional damping material.

DESCRIPTION OF THE INVENTION

By intermixing and heat processing, as by extrusion, injection molding, or calendering a small percentage of blown asphalt material in a combination of Polyvinyl chloride (PVC) and filler results in a material which has been found to have damping properties unexpectedly broadened considerably at high temperatures beyond the usual performance range. Measures of stiffness and energy dissipation characteristics of a material are a function of frequency and temperature at various strains. Rather than having a bell-shaped characteristic with a specific peak at about the usual 110 to 120 degrees F. as illustrated by curve 10 of FIG. 1 and diminishment from the peak in performance, the damping performance of the material of the invention illustrated by curve 20 continues to increase. The damping performance, it is found, increases as the temperature continues to increase to 160 degrees F. and higher without a peak being reached in the conventional manner. By way of example, such a damping material as represented by curve 20 is produced with a combination including polyvinyl chloride amounting by weight to about 47 percent, and fly ash also in an amount of about 47 percent by weight, with 5 to 7 percent of granular blown asphalt as a compatibilizer. Preferably about 6 percent of such asphalt has been determined by test to provide the desired amalgamation of the three product constituents. With too much asphalt in the mixture the resulting product becomes brittle and subject to breakage. With too little such asphalt, the combination is not as well integrated to provide a stable product. Process difficulties also result, such as extrusion difficulties, which result in pro-ducts having holes and tears in their matrix, A thorough mixture of particles of dry blown asphalt and filler particles with PVC fragments can provide a blend processable into the damping material of the invention. It is found, however, that property results can be improved by first initiating mixing or by thoroughly intermixing the particles of solid blown asphalt and filler before adding fragments of PVC during or for subsequent heating. A thorough intermixture of the solid blown asphalt and particles and filler particles can thus be assured without concern for the PVC fragments getting in the way. Much more flexibility and uniformity and an improved, appearance are thereby imparted to the final damping material.

Two approaches can be utilized to fabricate a damping product of the material blend of the invention, both of which utilize a dry blend of the mixture. In the first approach the dry blend of PVC and filler particles with granules of dry blown asphalt is fed in bulk form and heated in a twin screw extruder with a sheet die to form a continuous sheet of the material. In the second approach, the dry blend is fed through a pelletizing extruder to produce pellets of the combination of PVC, filler and asphalt which in turn can be bagged for subsequent processing or can be passed directly in batch form through another extruder having a sheet die to form a desired sheet of the damping material.

The blown asphalt ground to a granular form intermixed and combined with fragments of waste polyvinyl chloride and a filler results in an amalgamated damping product having a stable integrity much more than is possible by ordinary mixture of PVC with a filler. The asphalt facilitates uniform intermixture of millions of particles with the PVC, such as particles in platelet form intermixed within the visco-elastic material. Such an intermixture amalgamated by inclusion of blown asphalt results in peak dissipation of vibration energy at a much higher temperature than is otherwise conventionally available.

The damping mechanism for such material appears to function, in a sense, in two stages, in that the PVC appears to function as a damping material at a much lower temperature than the blown asphalt which has a higher softening temperature. PVC has a softening temperature in the order of 150 degrees F. whereas the asphalt has a comparative softening temperature in the order of 305–315 degrees F. Thus when the damping characteristics are matched material to material on a peak performance to temperature standard, the combined bulk material has an extended temperature range much beyond the usual 110 to 120 degrees F. peak for damping materials. Uses for vibration damping materials for energy dissipation and isolation can thus be much extended in present day usage.

In view of the foregoing it will be understood that many variations of the concept of the invention can be effected within broad scope of principles embodied therein. Thus while particular embodiments of the invention have been shown and described, it is intended by the appended Claims to cover all such modifications which fall within the true spirit and scope of the invention.

We claim:

1. A vibration damping material including as constituents in a combination polyvinyl chloride, a filler in particle form and, solid particles of blown asphalt as a compatibilizer for amalgamation of said constituents, said asphalt being present in an amount in the range of 5 to 7% by weight of said combination, said material being formed by intermixing said constituents and heating said combination to a softened state of said polyvinyl chloride and asphalt to effect amalgamation of said combination into said damping material.

2. A vibration damping material as set forth in claim 1 in which said polyvinyl chloride and filler particles are present in approximately equal amounts by weight of said combination.

3. A vibration damping material as set forth in claim 2 in which said filler is one of a group of particulate fillers consisting of fly ash, talc, mica and graphite.

4. A vibration damping material as set forth in claim 1 in which said blown asphalt compatibilizer amounts to approximately 6% by weight of said combination.

5. A vibration damping material as set forth in claim 2 in which said filler comprises fly ash particles.

6. A vibration damping material as set forth in claim 5 in which said polyvinyl chloride comprises waste electrical wire strippings.

7. A vibration damping material as set forth in claim 2 in which said filler comprises particles of talc.

8. A vibration damping material as set forth in claim 7 in which said polyvinyl chloride comprises waste electrical wire strippings.

9. A high and broad temperature band vibration damping material including as constituents in a combination fragments of polyvinyl chloride, a filler in particle form and, approximately 5 to 7% by weight of said combination being blown asphalt which functions as a compatibilizer to amalgamate said constituents, said polyvinyl chloride and filler being present in approximately equal amounts by weight of said combination, said material being formed by intermixing and heating said constituents to a heat softened state of said polyvinyl chloride and asphalt to effect amalgamation of said combination into said damping material.

10. A damping material as set forth in claim 9 in which said polyvinyl chloride comprises electrical wire strippings.

11. A method of producing a vibration damping material comprising mixing particles of a filler with a smaller amount by weight of solid particles of blown asphalt to form a mixture thereof adding and mixing polyvinyl chloride fragments with said mixture in an amount approximately equal to the weight of said filler particles to form a combination thereof, heating said combination to a softened state of said polyvinyl chloride to effect an amalgamation of said combination into said damping material.

12. A method as set forth in claim 11 in which said solid particles of blown asphalt amount to 5 to 7% by weight of said combination.

13. A method as set forth in claim 12 in which said fragments of polyvinyl chloride comprise waste polyvinyl chloride.

14. A method as set forth in claim 12 in which said fragments of polyvinyl chloride comprise waste electrical wire strippings.

15. A method as set forth in claim 12 in which said particles of filler and solid blown asphalt are first thoroughly mixed into said mixture before said polyvinyl chloride fragments are added and mixed therewith.

16. A method of producing a vibration damping material comprising accumulating fragments of polyvinyl chloride, providing a filler in particle form in an amount approximately equal in weight to said polyvinyl chloride for mixture therewith, providing particles of solid blown asphalt in an amount in the range of 5 to 7% by weight of said material, intermixing said particles of solid blown asphalt and filler and intermixing fragments of polyvinyl chloride therewith to form a combination thereof, heating said combination to a heat softened condition of said polyvinyl chloride and asphalt to effect amalgamation of said combination and thereby provide said vibration damping material.

17. A method of producing a vibration damping material as set forth in claim 16 in which said particles of blown asphalt and filler particles are thoroughly intermixed prior to intermixture of polyvinyl chloride therewith.

18. A method as set forth in claim 16 in which said polyvinyl chloride comprises recycled polyvinyl chloride.

19. A method as set forth in claim 16 in which said filler particles are fly ash particles.

20. A method as set forth in claim 16 in which said filler particles are talc particles.

* * * * *